INVENTOR
GERARDUS C. VAN DE MEERENDONK

Jan. 24, 1967   G. C. VAN DE MEERENDONK   3,299,453
UPSETTING MACHINE WITH CONTROLLABLE EJECTOR MEANS FOR THE
MANUFACTURE OF SCREWS, BOLTS, BOLT BLANKS AND THE LIKE
Filed Dec. 9, 1964                                   5 Sheets-Sheet 5

INVENTOR
GERARDUS C. VAN DE MEERENDONK
BY
Pennie, Edmonds, Morton, Taylor & Adams
ATTORNEYS

United States Patent Office 3,299,453
Patented Jan. 24, 1967

3,299,453
UPSETTING MACHINE WITH CONTROLLABLE EJECTOR MEANS FOR THE MANUFACTURE OF SCREWS, BOLTS, BOLT BLANKS AND THE LIKE
Gerardus Cornelis van de Meerendonk, Helmond, Netherlands, assignor to Nedschroef Octrooi Maatschappij N.V., Helmond, Netherlands, a limited-liability company of the Netherlands
Filed Dec. 9, 1964, Ser. No. 417,136
Claims priority, application Netherlands, Dec. 13, 1963, 301,772
6 Claims. (Cl. 10—12)

The present invention relates to improvements in upsetting machines for the manufacture of screw bolts, bolt blanks and the like, comprising a reciprocable carriage or header slide provided with one or more retaining elements for upsetting heads, said retaining elements cooperating with one or more matrices mounted in a die block or matrix plate set in the frame of the machine. Each of the upsetting heads is provided with a reciprocable member for ejecting the workpiece, bolt or similar article out of the upsetting head after it has been worked on or completed.

Each upsetting head is located at an upsetting station and where the machine is provided with several upsetting stations and heads for the stepwise upsetting of a workpiece or blank, the upsetting heads must contain cavities with different depths and, therefore, it must be possible to provide each upsetting station with an ejecting means which can be set independently from the setting used for the ejecting means of other stations. Therefore, the ejecting menas for a series of stations are made separately adjustable to provide the proper length of ejection stroke. In accordance with this object, a mechanism is provided for actuating an ejecting member for each ejecting head, said mechanism being operable by and during the movement of the carriage and being adjustable in such a way that the moment of ejection during the movement of the carriage can be predetermined.

In an embodiment of the machine according to the invention, each ejecting mechanism comprises a bell crank lever having two arms and pivotally mounted for a rocking motion or rotation on a shaft provided in the carriage. The projecting end of one of said arms is arranged to cooperate with a guiding means attached to the frame of the machine, while the projecting end of the other arm is arranged to actuate the ejecting member.

In a preferred embodiment of the machine according to the invention, the guiding means comprises two rectilinear guideways parallel to the path of movement of the carriage and ejecting member and located at different distances therefrom, said guideways being interconnected by an inclined connecting guideway.

An embodiment of a machine according to the invention is illustrated by way of example in the accompanying drawings forming a part of this application.

Figure 1:
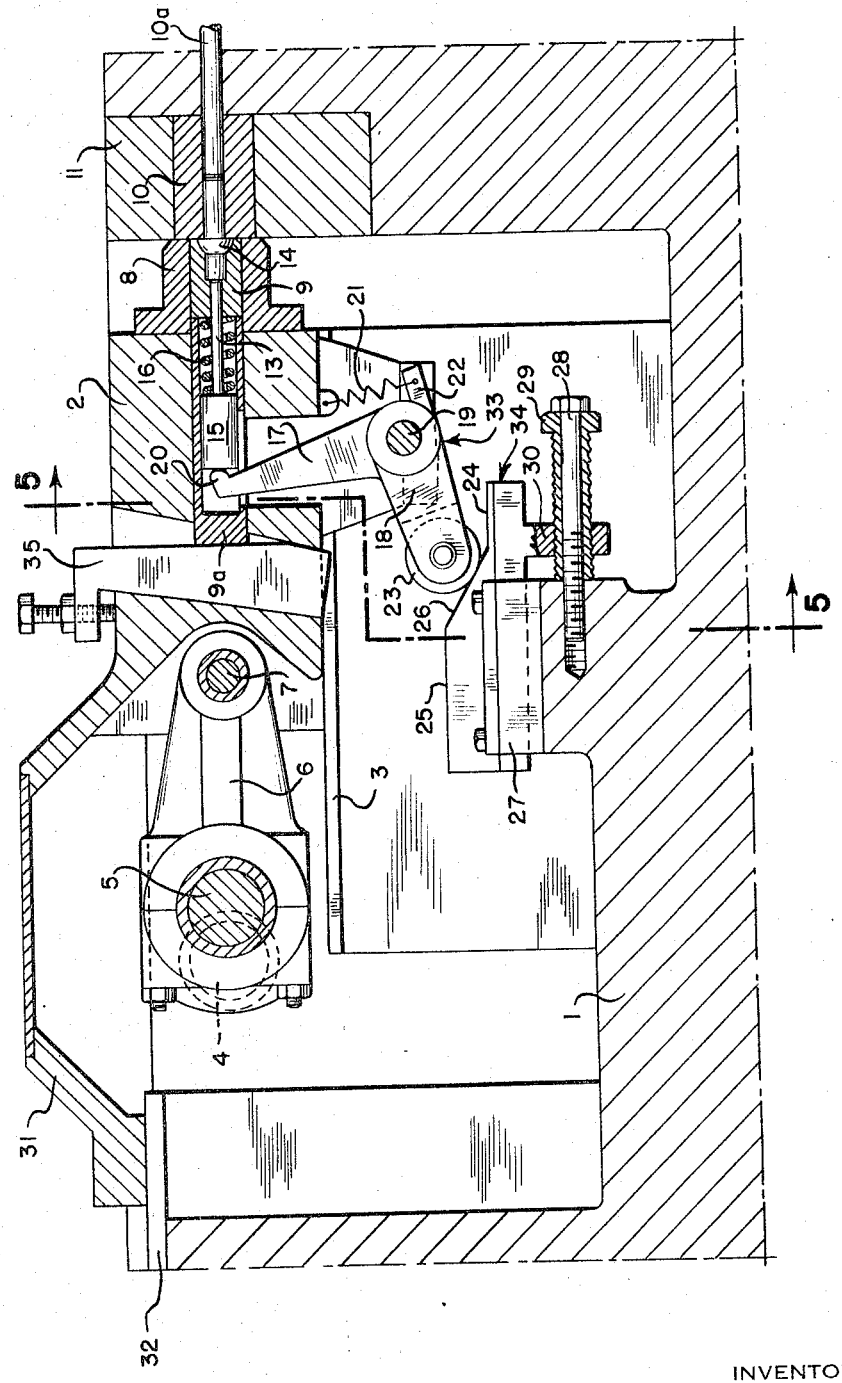
FIG. 1 is a partial longitudinal sectional view of the machine, the carriage of which is shown in its foremost position in which the upsetting head is at the matrix.

The improved machine construction shown in the drawings comprises a frame 1 in which is mounted a carriage 2 movable along and guided by a guiding means 3. The carriage 2 is driven by means of a crankshaft 4 having a crank 5 carrying a connecting rod 6 which is connected in a known manner to the carriage 2 by means of a pin 7. The carriage includes a part 31 extending up over the crankshaft as shown in FIG. 1, the left-hand part of which slides on a guiding means 32 at the upper part of the frame 1 as indicated diagrammatically. A plurality of upsetting head-retaining elements 8 are attached to the front of the carriage 2, one for each of the four ejecting mechanisms shown in FIG. 5. Exchangeable upsetting heads 9 are respectively mounted in the elements 8 facing matrices 10 mounted in a matrix or die block 11 which is set in the frame 1 opposite the carriage 2. Each upsetting head is backed by a hollow cylindrical plug 9a and is provided with an ejecting pin 13, reciprocable in a cavity 12 of the head 9. The arrangement is such that an article blank 14, formed in the cavity 12 and the facing cavity in matrix 10, as shown in FIG. 1, is ejected therefrom by pins 13 and 10a, as the carriage is retracted from the position shown in FIG. 1 to that shown in FIG. 2.

The ejecting pin 13 which is movable axially through the upsetting head 9 is provided with a piston-like enlargement 15 guided in the cylindrical bore of the hollow cylindrical plug 9a extending through a portion of the carriage 2, as shown in FIG. 1. A spring 16 is mounted under compression between the enlarged cylindrical end 15 and the upsetting head 9 so as to bias the pin 13 toward its retracted position, as illustrated in FIG. 1. The ejecting motion imparted to the pin 13 is controlled by a bell crank lever 33 having two arms 17 and 18 and fulcrumed for pivoting or rotation about the axis of a shaft 19 mounted in the carriage 2. The end 20 of the lever 17 projects into the bore of the stop member 9a and always cooperates with the enlarged end 15 of the ejecting pin 13. A spring 21 connected at one end to the carriage 2 and by its other end to the end of an arm 22 projecting from the bell crank lever 33 in a direction opposite to the extending arm 18 biases the bell crank lever to pivot in a counterclockwise direction, the same as the spring 16. The force of the spring 21, however, is smaller than the force of the spring 16. The projecting end of the arm 18, forming an angle of approximately 90° with the arm 17, is provided with a roller 23 which is arranged to roll on a guideway 34 provided on the frame 1 of the machine. The springs 16 and 21 bias the roller downwardly toward the guideway.

Figure 2:
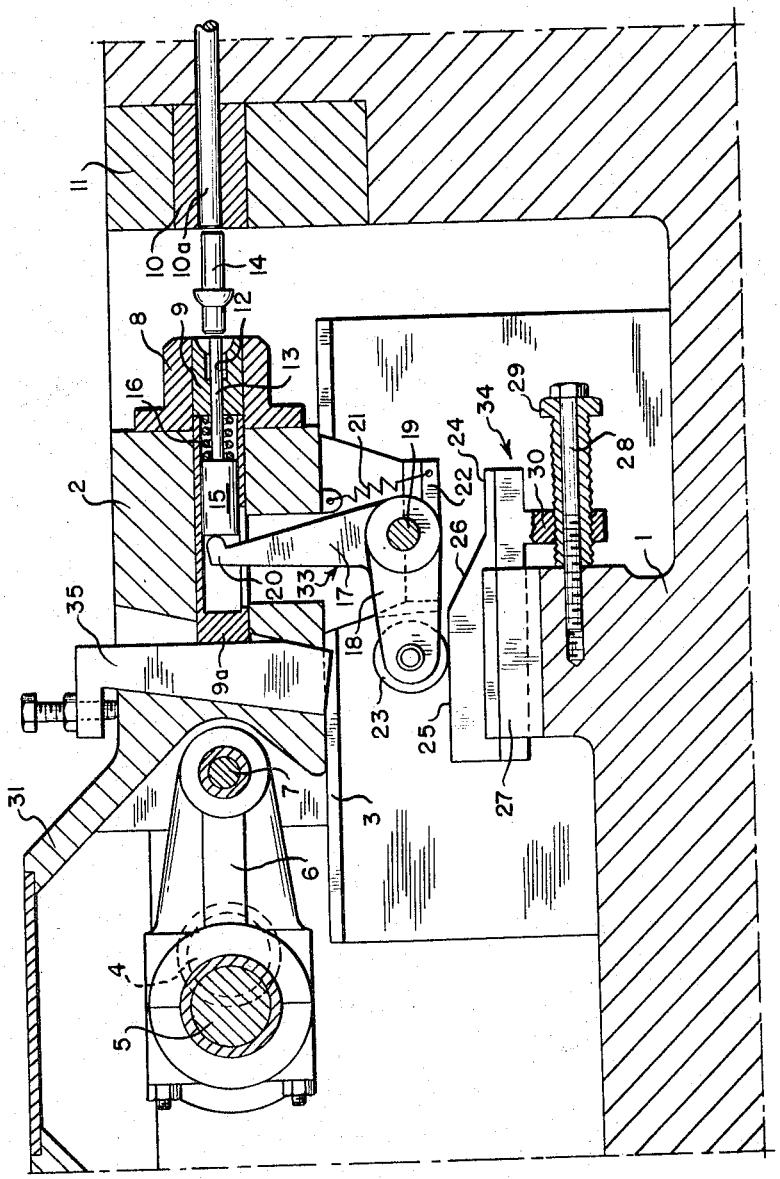
FIG. 2 is a view similar to that of FIG. 1 showing the carriage in its most retracted position.

As shown in the drawings, the guideway 34 comprises two rectilinear portions 24 and 25, the upper guiding surfaces of which are parallel to the guiding means 3 of the carriage 2. When the roller 23 is on or moving along one of the two portions 24 or 25, there is no relative movement between the ejecting pin 13 and the upsetting head 9 or the carriage 2. The portions 24 and 25 of the guideway are connected with each other by an inclined guideway portion 26. When the roller 23 ascends this portion of the guideway during the backward movement of the carrier 2, the bell crank lever 33 is rocked clockwise on the axis of the shaft 19 so that the end 20 of the arm 17 is moved relative to the carriage toward the upsetting head 9 and, therefore actuates the ejecting pin 13 to eject the article then positioned in the upsetting head 9. FIG. 2 shows the carrier 2 in its retracted position and the position of the pin 13 after the article has been ejected.

Figure 5:
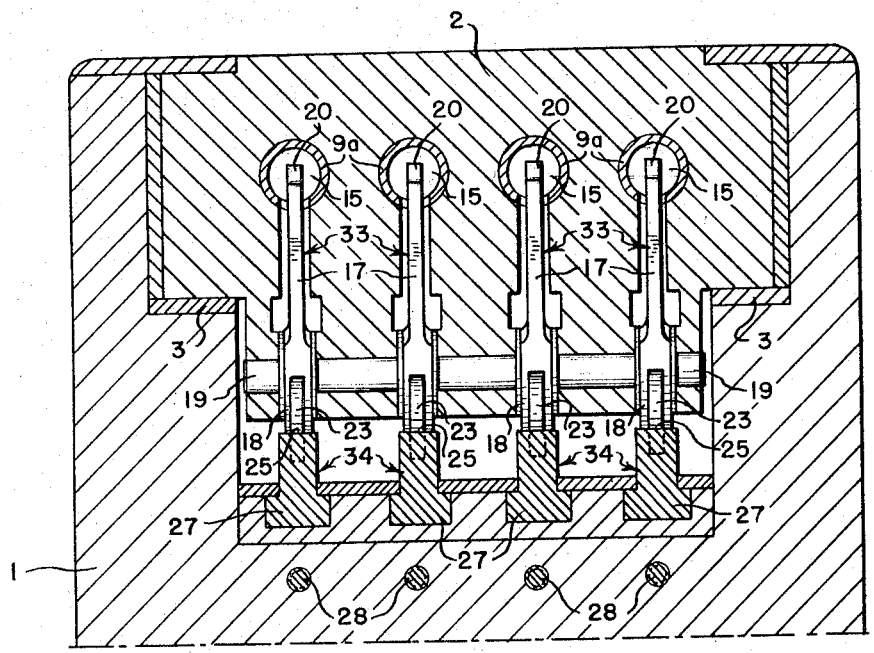
FIG. 5 is a cross-sectional view of the machine taken along the line V—V of FIG. 1.

The guideway 34, comprising the portions 24, 25 and 26 is movable as a unit in a retaining slide 27 attached to the frame 1, the guideway being movable in a direction parallel to the direction of movement of the carriage 2 or parallel to the guiding means 3. The guideway 34 for the roller 23 may be shifted to a predetermined adjusted position for the location of the portions 24, 25 and 26. This may be effected by rotating an externally-threaded adjusting sleeve 29 threaded through a lug 30 projecting from the guideway 34. The adjusting sleeve 29 is provided with a hexagonal enlarged end at the right and is mounted for rotation on a lock bolt 28 threaded into the frame of the machine. When the bolt 28 is loosened, the threaded sleeve 29 may be rotated to shift the slide forward or back, after which the sleeve 29 is locked by tightening the bolt 28. FIG. 5 shows the mechanisms for actuating the ejecting pins 13 for four upsetting heads 9 arranged in series in the carrier 2, each of which includes an adjustable slide 34.

The plug 9a is adjustable lengthwise in the carriage 2 to correctly position the upsetting head 9 relative to the matrix 10. The plug 9a is held in adjusted position by the vertically movable wedge 35 located in back of the plug. The wedge 35 may be set in its adjusted position by means of the lock bolt at the top in a known manner.

The improved ejecting mechanism of the machine operates in the following manner.

Figure 3:
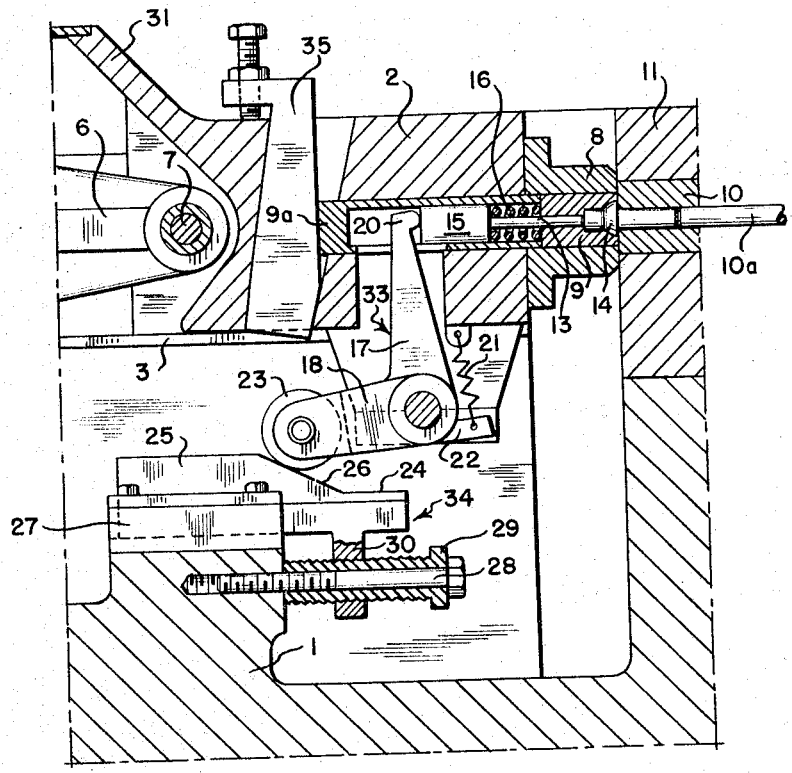
FIG. 3 is a view like that of FIG. 1 showing the ejecting mechanism adjusted for making a short stroke.

Since the guideway 34 for each station can be shifted to the desired adjusting position by actuating the externally threaded member 29, the roller 23 can be caused to ascend the inclined portion 26 at an earlier or later moment during the backward movement of the carriage 2, by which, therefore, also the ejecting pin 13 will be moved earlier or later. On the backward stroke of the carriage 2, with the guideway 34 set in the position shown in FIG. 3, the ejecting stroke will be decreased with respect to that illustrated in FIGS. 1 or 2, which is desirable when shorter or already shortened article blanks are upset in the cavity 12. In FIG. 3, it will be noted that the guideway 34 has been moved to the right relative to the position of that shown in FIGS. 1, 2 or 4.

Figure 4:
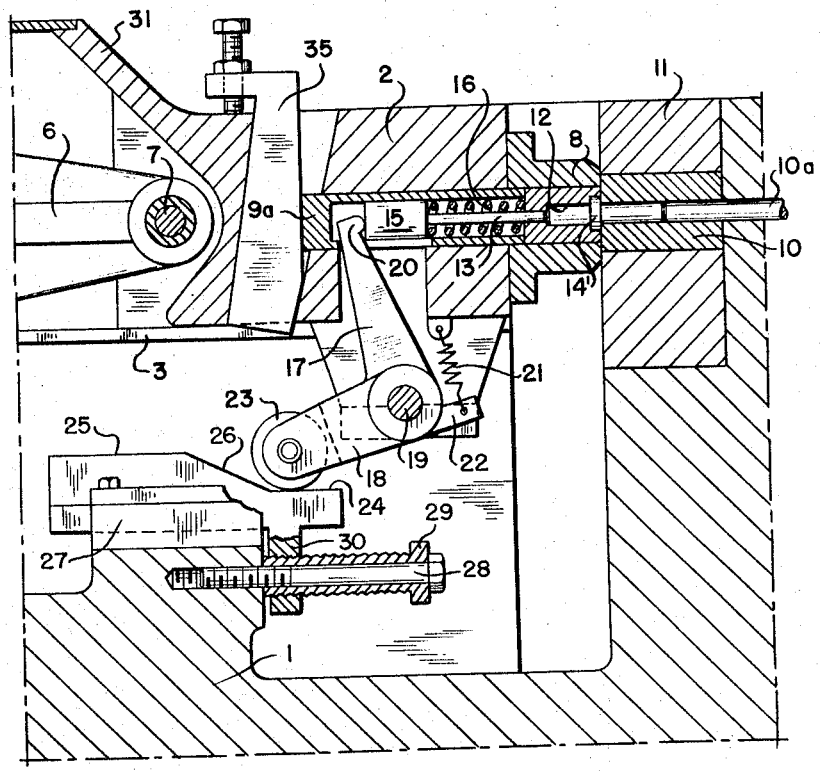
FIG. 4 is a view like that of FIG. 1 showing the ejecting mechanism adjusted for making a long stroke.

When the guideway 34 shown in FIG. 4 is shifted to the left, the ejecting stroke of the pin 13 will be longer during the backward movement of the carriage, which is desirable when longer article blanks are upset in the cavity 12. It will be noted that the cavity 12, as shown in FIG. 4, is longer than that shown in FIGS. 1 and 2 and that the cavity 12 in FIG. 3 is the shortest.

In a machine provided with a series of upsetting stations, as shown in FIG. 5, which may be used for the stepwise upsetting of a bolt blank or similar workpiece, the cavities 12 in the upsetting heads 9, as described above, may have different depths, for example they may be progressively shorter as the workpiece is transferred from station to station. In accordance with the invention, it is possible to individually adjust the length of the ejecting stroke to correspond with the depths of the cavities 12 in the upsetting heads. It will be understood that the machine includes a suitable transfer mechanism for transferring workpieces from station to station. As the carrier or tool slide 2 moves forward from the position shown in FIG. 2 the transferred workpieces are in position to be respectively received in the upsetting heads 9 and matrices 10, and the ejecting pins 10a and 13 are retracted to the positions shown in FIGS. 1, 3 and 4 with the ends of pins 13 respectively at the left-hand ends of the cavities 12. A portion of each workpiece is received in the cavity of the matrix 10, as shown, and the ejecting pin 10a therein cooperates in a known manner with a pin 13 to eject the workpiece, for example the workpiece 14, to the position shown in FIG. 2.

A machine according to the invention may include one or more upsetting stations as may be desirable or necessary to form a particular article. The article shown in FIG. 3 may be a shorter or a modification of the article 14 shown in FIGS. 1 and 2, while the article 14' in FIG. 4 is long and has a different form with a flange intermediate its ends. These articles or products are typical examples of the products which can be produced on a machine constructed in accordance with the present invention. In FIG. 5 the rollers 23 for the four stations are shown at the same height as when used for cavities 12 of the same depth or before adjustment for cavities of different depths.

I claim:
1. In a machine for upsetting workpieces for the production of bolts and the like, including a frame, a reciprocable carriage mounted for reciprocation in the frame carrying a workpiece-upsetting means having a forming cavity for receiving a portion of the workpiece and movable toward and away from a matrix mounted in the frame, a reciprocable workpiece-ejecting member mounted in the upsetting means for ejecting the workpiece from said cavity after it has been upset in the cavity of the upsetting means, mechanism for actutating the ejecting member to eject the workpiece including a control guideway attached to the frame, and an actuating means movable along and in engagement with said control guideway and acting on said ejecting member, wherein the improvement comprises means for adjusting the position of the control guideway so as to vary the movement of said actuating means.

2. A machine as claimed in claim 1, in which said actuating means for actuating the ejecting member comprises a bell crank lever pivoted on the carriage below the ejecting member and having a pair of arms, one arm of which extends upwardly and acts on said ejecting member, and in which said guideway is attached to the frame of the machine below the carriage for directly controlling the movement of the other arm of the bell crank lever and its rocking during the reciprocating movement of the carriage.

3. A machine as claimed in claim 2, in which said guideway attached to the frame of the machine comprises a guiding means on which the projecting end of said other arm of the bell crank lever acts directly for predetermining the movement of the ejecting member relative to the upsetting means and the carriage.

4. A machine as claimed in claim 1, wherein said adjusting means comprises means for setting said control guideway in a predetermined longitudinal position relative to the path of movement of the carriage.

5. A machine as claimed in claim 3, in which said guideway for said projecting end includes a pair of spaced rectilinear guideway portions positioned at different distances parallel to the path of movement of the carriage and the ejecting member, and an inclined guideway portion interconnecting said two guideway portions.

6. A machine as claimed in claim 5, in which said guideway comprises a unit slidably mounted on the frame of the machine for movement parallel to the path of movement of the carriage and means for setting the guideway in a predetermined position in accordance with the depth of the forming cavity to be used in the upsetting means.

References Cited by the Examiner
UNITED STATES PATENTS

| | | | |
|---|---|---|---|
| 2,271,257 | 1/1942 | Friedman | 10—11 |
| 2,680,860 | 6/1954 | Friedman | 10—26 X |
| 3,143,008 | 8/1964 | Payne | 10—17 X |
| 3,171,144 | 3/1965 | Maistros | 10—76 |

ANDREW R. JUHASZ, *Primary Examiner.*